(12) United States Patent
Moore et al.

(10) Patent No.: US 7,310,641 B2
(45) Date of Patent: Dec. 18, 2007

(54) MULTIPLE REDUNDANT SERVICES WITH REPUTATION

(75) Inventors: George M. Moore, Issaquah, WA (US); Georgios Chrysanthakopoulos, Seattle, WA (US); Henrik Frystyk Nielsen, Hunts Point, WA (US)

(73) Assignee: Microsoft Corporation, Redmond, WA (US)

( * ) Notice: Subject to any disclaimer, the term of this patent is extended or adjusted under 35 U.S.C. 154(b) by 393 days.

(21) Appl. No.: 10/909,139

(22) Filed: Jul. 30, 2004

(65) Prior Publication Data

US 2006/0026123 A1 Feb. 2, 2006

(51) Int. Cl.
*G06F 15/18* (2006.01)
(52) U.S. Cl. .......................................... 707/6
(58) Field of Classification Search ............. 707/6; 709/204, 217
See application file for complete search history.

(56) References Cited

U.S. PATENT DOCUMENTS

| | | | |
|---|---|---|---|
| 7,016,892 B1* | 3/2006 | Kokkonen et al. | 707/3 |
| 2004/0193696 A1* | 9/2004 | Howard et al. | 709/217 |
| 2005/0086300 A1* | 4/2005 | Yeager et al. | 709/204 |

OTHER PUBLICATIONS

Dellarocas, Chrysanthos, "Efficiency through Feedback-contingent Fees and Rewards in Auction Marketplaces with Adverse Selection and Moral Hazard," *Proceedings of the 4th ACM Conference on Electronic Commerce*, Jun. 2003, pp. 11-18.

Fujimura, Ko, et al. "Reputation Rating System Based on Past Behavior of Evaluators," *Proceedings of the 4th ACM Conference on Electronic Commerce*, Jun. 2003, pp. 246-247.

Gupta, Minaxi, et al., "A Reputation System for Peer-to-Peer Networks," *Proceedings of the 13th international workshop on network and operating systems support for digital audio and video*, Jun. 2003, pp. 144-152.

Lepreau, Jay, et al., "Session Summaries from the 17th Symposium on Operating Systems Principles (SOSP'99)," *ACM SIGOPS Operating Systems Review*, vol. 34, Issue 2, Apr. 2000, pp. 4-41.

Malaga, Ross A., "Web-Based Reputation Management Systems: Problems and Suggested Solutions," *Kluwer Journals*, Electronic Commerce Research, Abstract, Oct. 2001, 1 page.

(Continued)

*Primary Examiner*—Cheyne D Ly
(74) *Attorney, Agent, or Firm*—Lee & Hayes, PLLC (57) ABSTRACT

Multiple copies of web services reside on associated computing devices, each having an associated reputation. A client may desire to access the web service having the highest or best reputation to be ensured of a greater degree of accuracy and confidence. The client does a search, and attaches to whichever web service has the highest reputation. By running multiple copies of the web services, they may vote amongst themselves on the results in the event that one or more of the services starts giving incorrect or otherwise inconsistent results. Combining the voting with reputation data associated with each copy of the web service allows a service's reputation to be dynamically adjusted based upon how faithfully it computes the results of work items sent to it.

6 Claims, 9 Drawing Sheets

OTHER PUBLICATIONS

Maximilien, E. Michael, et al. "Reputation and Endorsement for Web Services," *ACM SIGecom Exchanges*, vol. 3, Issue 1, Dec. 2001, pp. 24-31.

Patterson, Joseph O., "A Matter of Trust: Reputation Management in Peer-to-Peer Networks," 9 pages.

Phoenix, S.J.D., "Cryptography, trusted third parties and escrow," *Kluwer Journals*, BT Technology Journal, Abstract, Apr. 1997, 1 page.

Resnick, Paul, et al., "Reputation Systems," *Communications of the ACM*, vol. 43, Issue 12, Dec. 2000, pp. 45-48.

* cited by examiner

```
UNILATERALCONTRACT OSSERVICE {    310A-3

// AVAILABLE MESSAGES        310A-4
OPEN(FILENAME);
PLAY(PORT);                  310A-5
RECORD(DATA);
CLOSE(FILENAME);             310A-6
                             310A-7

// BEHAVIORS
B = OPEN.BPR;                310A-8
BPR = PLAY.BPR + RECORD.BPR + CLOSE;   310A-9
}
```

FIG. 3C

```
UNILATERALCONTRACT OSSERVICE {    310B-3

// AVAILABLE MESSAGES        310B-4
OPEN(FILENAME);
PLAY(PORT);                  310B-5

CLOSE(FILENAME);             310B-6

// BEHAVIORS
B = OPEN.BP;                 310B-7
BP = PLAY.BP + CLOSE;   310B-8
}
```

MULTIPLE REDUNDANT SERVICES WITH REPUTATION

FIELD OF THE INVENTION

The present invention relates generally to the field of information management, and, more particularly, to the identification and execution of multiple web services with reputation data.

BACKGROUND OF THE INVENTION

There are many types of computing services, resources and data that computer users and applications need to manage and otherwise access. Such resources and data include services and data maintained locally, and data maintained on corporate networks and other remotely accessible sites including intranets and the internet.

The concept of web services is generally directed to providing a computing service to clients via protocols and standards that are cross-platform in nature. In general, web services provide the basic tools for wiring the nodes of a distributed application together, regardless of the type of platform on which the requesting client is running. As there are many different computing platforms, various platform-independent mechanisms and protocols that facilitate the exchange of network information are becoming commonplace in web services, including HTTP (HyperText Transfer Protocol), XML (eXtensible Markup Language), XML Schema, and SOAP (Simple Object Access Protocol) XML. Traditional web services, in which businesses, organizations, and other providers offer services to users and applications, are presently based on these standards. Moreover, a web service can represent other types of resources, such as hardware devices, databases, and the like.

Currently, the protocols by which web services exchange data with a client allow a client to send a message to a server port (e.g., URI) corresponding to the service and receive a message back at the client, in a manner agreed on according to a contract provided by the web service.

Reputation management systems are well-known in peer-to-peer networks, which provide a means of distributing many kinds of data, such as music, movies, and software. Given the open nature of these networks (that is, the fact that they allow anyone on the network to share any type and number of files), peer-to-peer networks are prone to abuses by anonymous malicious peers who share inauthentic files. The presence of these malicious peers can lead to the network becoming inundated with viruses, spam, and other inauthentic files. Recognizing this problem has led researchers to propose reputation management systems for these networks. These reputation management systems are algorithms that allow individual peers on a peer-to-peer network to rate each other according to the quality of their past transactions with each other. Once a peer has been rated, its rating can be used by other peers to help them find the best sources of good, authentic files and keep the effects of malicious peers on the network to a minimum.

There are several reputation management systems that are currently being used in situations such as online auctions and file sharing. eBay is a website where buyers and sellers can meet and conduct auctions entirely online. In eBay's reputation management system, buyers and sellers can rate each other based on their past transactions with each other. This is done via users leaving comments on one another's eBay user pages, which can be positive, neutral, or negative. An eBay member's reputation is calculated by assigning each type of comment a point value (+1 point for positive comments, 0 points for neutral comments, and −1 point for negative comments) and summing the point values of all of a member's transactions to obtain that member's "reputation." An eBay user's reputation score can then be used by other users as a factor in their decisions on whether or not to conduct a transaction with that user.

Kazaa is a peer-to-peer file sharing application that allows its users to share files with other Kazaa users. It also allows users to search for and download files from other users who are sharing them. Kazaa has implemented a reputation management system consisting of two components, "Integrity Rating" and "Participation Levels." Integrity Rating allows peers who share files to rate their own files in terms of their technical merits, such as whether the files have accurate metadata and are of high quality. In order to guide other peers toward the highest-quality files available for download, users are encouraged to Integrity Rate their files and delete files that should not be shared (e.g., virus-infected files or files that are corrupted).

In Kazaa's reputation management system, each peer has a "Participation Level" that is based on the quality and amount of files that it shares. A peer's Participation Level is a number that reflects the ways in which that peer has used Kazaa to upload and download files. A peer's Participation Level is meant to reward peers who share many Integrity Rated files by providing those peers with increased bandwidth that they can use to download files from other peers on the network.

There are several other proposed reputation management systems, such as Debit-Credit Reputation Computation (DCRC), Credit-Only Reputation Computation (CORC), and Distributed Polling (Xrep). DCRC works by crediting peers' reputation scores for serving content and debits them for downloading. CORC credits peers' reputation scores for serving content, but does not debit them. Under CORC, the expiration of a peer's reputation score serves as a debit. In DCRC and CORC, peers can also earn credit for staying online and processing query requests sent to them by other peers. Since DCRC and CORC allow peers to store their own reputation scores, these reputation management schemes use a central Reputation Computation Agent which is contacted periodically by the peers to earn credit for their contribution to the network.

Distributed Polling (Xrep Protocol) determines whether peers are trustworthy based on votes that peer i takes regarding other peers' experiences with each peer j who responds to i's queries for content. In Xrep, each peer maintains a resource repository, which is a table that assigns a binary value describing whether a given resource is good (+) or bad (−). Each peer also has a servant repository, which is a table that keeps track of each servant, or other peer, that a peer has interacted with and records the numbers of successful and unsuccessful downloads from that peer.

When peer i receives responses to a search query from other peers, it will find the best download source for the file that it is looking for by polling its peers for their opinions of the resource and the peers that offer it. After receiving a set of votes from the other peers, i will discard any votes that have been tampered with and cluster the remaining votes by their IP addresses. i will then weight the votes within each cluster, such as by taking an average of the cluster's votes weighted on the size of the cluster. Next, i will contact the most reliable peer that hosts the file (based on the votes that i has received) to determine that the peer does indeed host the file. If this is true, then i will connect to the servant and download the file.

Web services do not currently provide reputation data and are not accommodated in reputation management systems. There is no way for multiple copies of web services to determine which result, when results among the web services differ, is correct. Moreover, there is no mechanism for determining which web services are important enough or desirable enough to be run as identical copies across multiple computing devices.

In view of the foregoing, there is a need for systems and methods that overcome these deficiencies.

SUMMARY OF THE INVENTION

The following summary provides an overview of various aspects of the invention. It is not intended to provide an exhaustive description of all of the important aspects of the invention, nor to define the scope of the invention. Rather, this summary is intended to serve as an introduction to the detailed description and figures that follow.

The present invention is directed to web services, residing on associated computing devices, each having an associated reputation. A client may desire to access the web service having the highest or best reputation to be ensured of a greater degree of accuracy and confidence. The client calls the search service, passing in a contract that represents the requested service behaviors, and attaches to whichever has the highest reputation.

According to aspects of the invention, multiple copies of web services may vote amongst themselves on the results in the event that one or more of the services starts giving incorrect or otherwise inconsistent results. More particularly, the web services may run in lock-step with each other, starting from the same original state. Such web services desirably process identical protocols, and vote amongst themselves on the results of each protocol response back to the calling service. Desirably, an odd-numbered copy of services is used in scenarios involving voting, in order to prevent voting deadlocks or ties.

According to further aspects of the invention, by combining this voting with reputation data associated with each copy of the web service, a service's reputation can be dynamically adjusted based upon how faithfully it computes the results of work items (e.g., messages) sent to it. Once a web service on a particular node passes a certain reputation threshold (meaning that the web service's reputation has decreased beyond a predetermined acceptable level), the system can fail over to a healthy node, shun the poorly behaving service, cut off its life support (e.g., scheduling, memory management), kill it, and/or restart the service on a known good node.

Further aspects of the invention involve determining which services should have multiple copies made and run on multiple computing devices. The worthy or important services may be dynamically determined at runtime based upon an observation of the resources the service requests, plus a notion of relative service priority.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Overview

Multiple copies of web services reside on associated computing devices, each having an associated reputation. A client may desire to access the web service having the highest or best reputation to be ensured of a greater degree of accuracy and confidence. The client calls the search service, passing in a contract that represents the requested service behaviors, and attaches to whichever web service has the highest reputation. Multiple copies of web services may vote amongst themselves on the results in the event that one or more of the services starts giving incorrect or otherwise inconsistent results. Combining the voting with reputation data associated with each copy of the web service allows a service's reputation to be dynamically adjusted based upon how faithfully it computes the results of work items sent to it.

Exemplary Computing Environment

Figure 1:
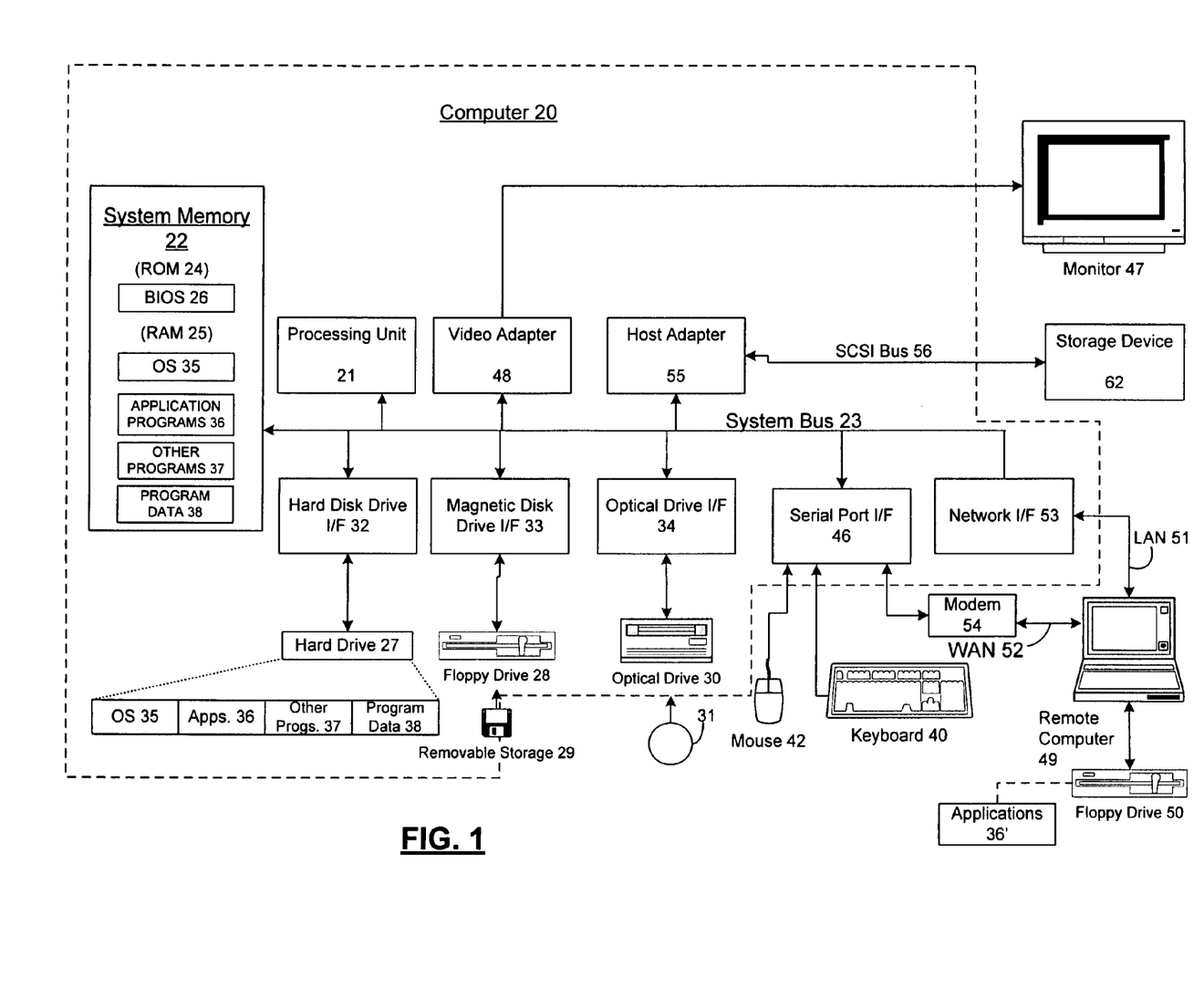
FIG. 1 is a block diagram showing an exemplary computing environment in which aspects of the invention may be implemented.

Numerous embodiments of the present invention may execute on a computer. FIG. 1 and the following discussion are intended to provide a brief general description of a suitable computing environment in which the invention may be implemented.

Those skilled in the art will appreciate that the invention may be practiced with other computer system configurations, including handheld devices, multiprocessor systems, microprocessor based or programmable consumer electronics, network PCs, minicomputers, mainframe computers and the like. The invention may also be practiced in distributed computing environments where tasks are performed by remote processing devices that are linked through a communications network.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices comprising press buttons, or capable of determining button presses, or the equivalents of button presses, regardless of whether such devices are electronic, mechanical, logical, or virtual in nature.

Figure 2:
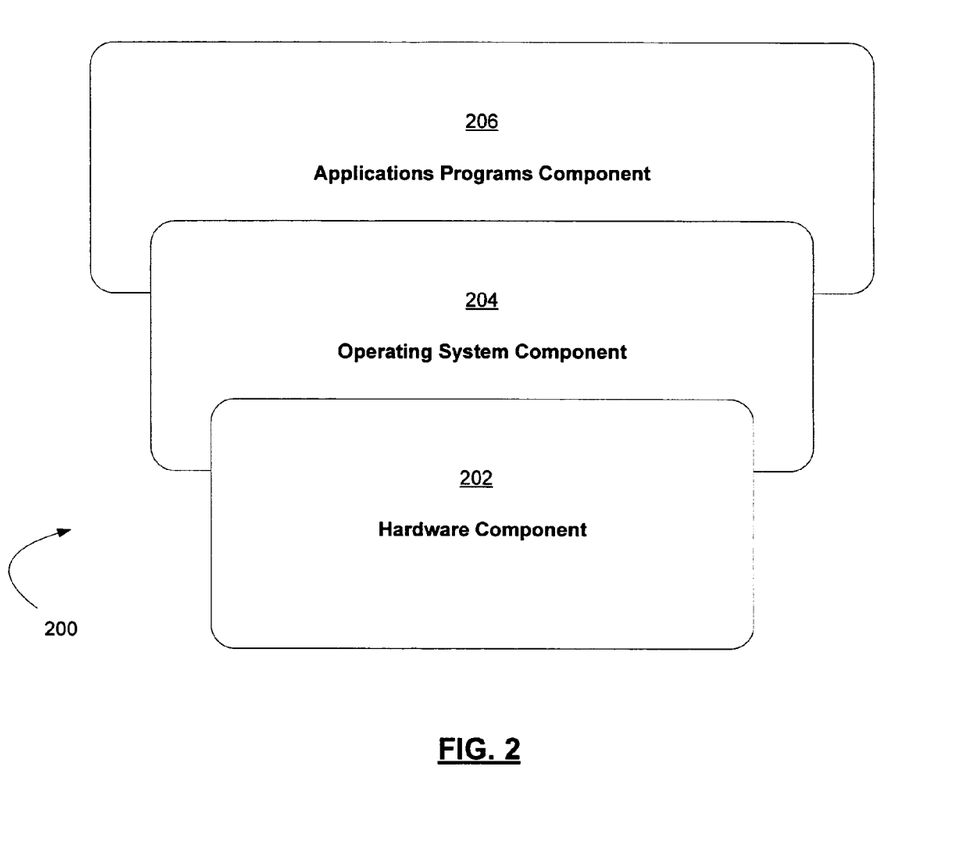
FIG. 2 is a block diagram illustrating a computer system divided into three component groups: the hardware component, the operating system component, and the applications programs component.

As illustrated in the block diagram of FIG. 2, a computer system 200 can be roughly divided into three component groups: the hardware component 202, the operating system component 204, and the applications programs component 206.

In certain computer systems 200, and referring back to FIG. 1, the hardware 202 may comprise the central processing unit (CPU) 21, the memory (both ROM 24 and RAM 25), the basic input/output system (BIOS) 26, and various input/output (I/O) devices such as a keyboard 40, a mouse 42, a monitor 47, and/or a printer (not shown), among other things. The hardware component 202 comprises the basic resources for the computer system 200.

The applications programs component 206 comprises various software programs including but not limited to compilers, database systems, word processors, business programs, videogames, and so forth. Application programs provide the means by which computer resources are utilized to solve problems, provide solutions, and process data for various users (e.g., machines, other computer systems, and/or end-users).

The operating system component 204 comprises the operating system itself and its shell and kernel. An operating system (OS) is a special program that acts as an intermediary between application programs and computer hardware, and the purpose of an operating system is to provide an environment in which a user can execute application programs. The goal of any operating system is to make the computer system convenient to use, as well as utilize the computer hardware in an efficient manner.

The operating system is generally loaded into a computer system at startup and thereafter manages all of the application programs (or simply "applications") in the computer system. The application programs interact with the operating system by requesting services via an application program interface (API). Some application programs enable end-users to interact with the operating system via a user interface such as a command language or a graphical user interface (GUI).

An operating system traditionally performs a variety of services for applications. In a multitasking operating system where multiple programs may be running at the same time, the operating system determines which applications should run in what order and how much time should be allowed for each application before switching to another application for a turn. The operating system also manages the sharing of internal memory among multiple applications, and handles input and output to and from attached hardware devices. The operating system also sends messages to each application (and, in certain cases, to the end-user) regarding the status of operations and any errors that may have occurred.

An operating system's shell is the interactive end-user interface to an operating system. A shell is the outer layer of an operating system that is directly accessible by application programs and even directly by end-users. In contrast to a shell, the kernel is an operating system's innermost layer that interacts directly with the hardware components.

Distributed Operating System

Figure 3A:
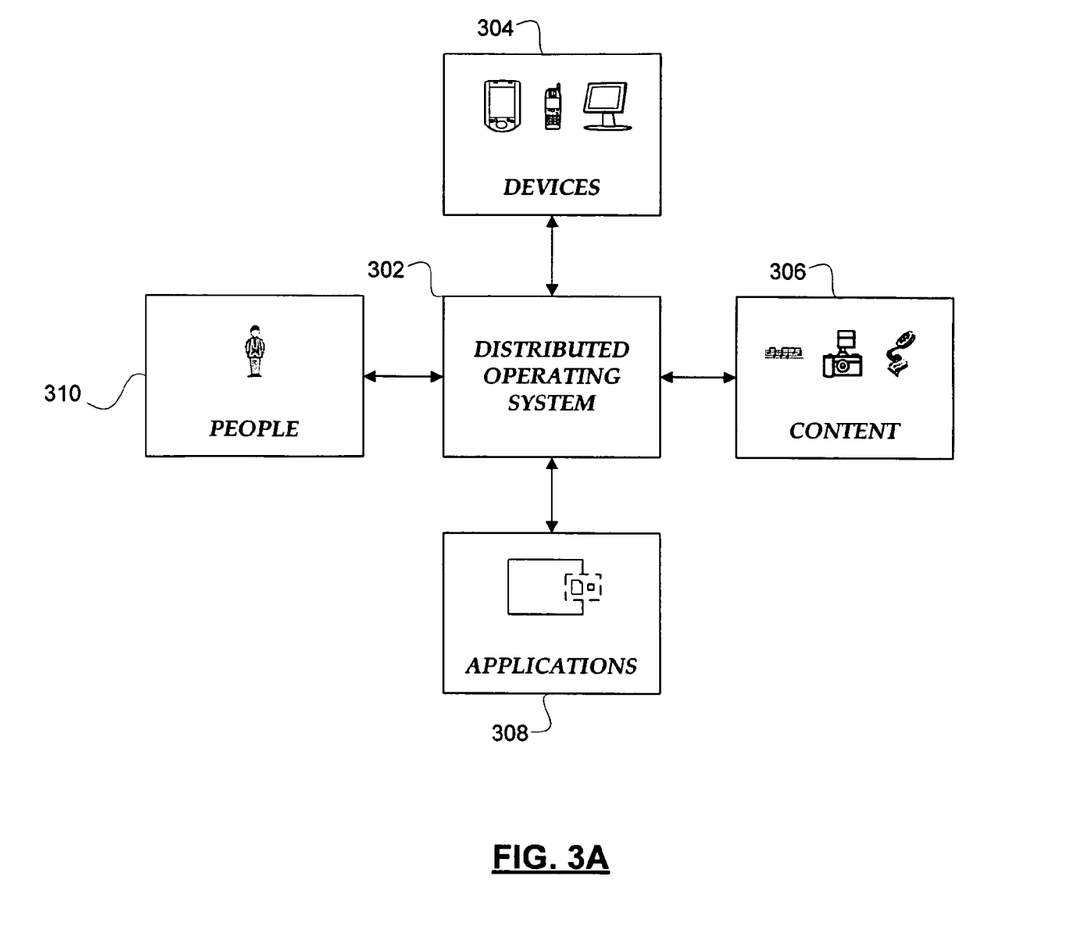
FIG. 3A is a block diagram illustrating a distributed operating system for creating unity among a multiplicity of devices, content, applications, and people, that may be used in accordance with the present invention.

A distributed operating system 302 is illustrated in FIG. 3A. The distributed operating system participates in a non-centralized network consisting of numerous computer systems that can communicate with one another and that appear to users as parts of a single, large, accessible "storehouse" of shared hardware, software, and data. The distributed operating system 302 is conceptually the opposite of a centralized, or monolithic, operating system in which clients connect to a single central computer, such as a mainframe. The power of control and coordination of the distributed operating system 302 comes not from being at one place at one time but instead comes from being capable of an omnipresence to compose services, local or remote, and form applications that are desired by users.

The distributed operating system 302 creates unity from multiplicity. The multiplicity includes devices 304, which include any piece of equipment or mechanism designed to serve a special purpose or perform a special function, such as a personal digital assistant, a cellular phone, or a monitor display, among others. The multiplicity also includes any piece of content 306, such as sound, graphics, animation, video, or other pieces of data or information. The multiplicity further includes applications 308, which are programs designed to assist in the performance of a specific task, such as word processing, accounting, or inventory management. Applications 308 are compositions of one or more services. The multiplicity yet further includes people 310. The people 310 are those individuals wishing to gain access to the distributed operating system 302 to use resources, such as devices 304, pieces of content 306, and applications 308.

Devices 304, content 306, applications 308, and people 310 can be abstracted as autonomous computation entities called services that exchange messages according to protocols, which are defined by each service. Services can be local to a computer system but can also be located at a remote computer system. Services can be accessed through a single trust domain but can also be accessed through another trust domain with its own security policy. Services can be discoverable through a directory service but can also be discovered by services that are not directory services.

The distributed operating system 302 unifies devices 304, content 306, applications 308, and people 310 to create a computing environment for composing services, and allows the discovery of services and the composition of services. Devices 304, content 306, applications 308, and people 310 are loosely coupled to the distributed operating system 302. Yet, the distributed operating system 302 can compose, arrange, or combine various pieces of the multiplicity. Each piece of the multiplicity 304-310 need not be known a priori by the distributed operating system 302, but each piece is preferably discoverable so that the distributed operating system 302 can compose, arrange, or combine to create the desired functionality. This unifying effect of the distributed operating system 302 allows every piece in the multiplicity to know how to communicate to every other one regardless of how diverse one piece of the multiplicity might be. Because devices 304, content 306, applications 308, and people 310 can be unified, each of them can be located locally or dispersed remotely and yet all of them can communicate with one another.

Figure 3B:
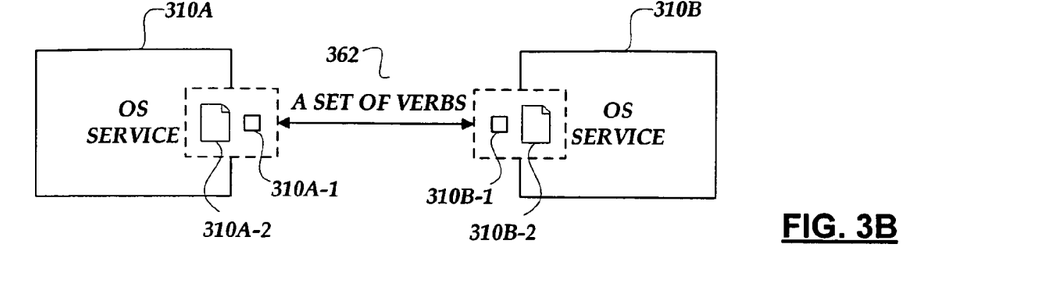
FIG. 3B is a block diagram illustrating two operating system services communicating with one another in accordance with the present invention.

FIG. 3B illustrates two operating system services 310A, 310B, each with a port identifiable by a uniform resource indicator (URI) 310A-1, 310B-1, which constitutes a unique designation of an operating system service or another service, and a unilateral contract 310A-2, 310B-2. Several primitives are described: a designation primitive, which comprises a port, such as the ports identifiable by the URI, 310A-1, 310B-1; a behavioral primitive, which comprises the unilateral contract, such as unilateral contracts 310A-2, 310B-2; an organizational primitive, which comprises a service, such as operating system services 310A, 310B; and a communication primitive, which includes a set of verbs 362 known by all services, that separates the data plane from the control plane for facilitating communication of control information and data information. The term "verb" means the inclusion of commanding, instructing, ordering, calling, controlling, requesting, or managing a service to perform a certain task. The set of verbs 362 is essentially a protocol for expressing behaviors for services running on a distributed operating system.

These primitives are capable of being applied at various levels, such as a retrogression to a less complex level of organization or a progression to a more complex level of organization: at a file containing a piece of content 306; at a device among devices 304, which can be either internal or external to a computer system; at an application among applications 308; at a computer system; across a home or an office; across an entire neighborhood or multiple offices of an organization; and across the entire world. This retrogression and progression is made possible by the use of a combination of these primitives everywhere.

Ports of services are endued with behavioral types, which are specified by the unilateral contracts. An exemplary communication mechanism of the distributed operating system 302 is through programmatically wired ports. Wired ports are possible if the behavior type of one port (of a service) is compatible with the behavior type of another port (of another service). When ports are programmatically wired to each other, which are identifiable by URIs 310A-1, 310B1, operating system services 310A, 310B communicate by sending messages to each other. Unilateral contracts 310A-2, 310B-2 are expressed in a language specifying an order of messages which flow in or out of operating system services 310A, 310B. By the use of messages, resources distributed in multiple trust domains, each with its own security policy, can communicate with one another.

Sharing of resources is possible through interaction in a compatible way with the behaviors of the resources. Behaviors of resources (represented by services) are expressed in unilateral contracts. For example, a file can be a service. A service can be regulated by a unilateral contract. Thus, one can attach behavioral conditions to files via unilateral contracts to govern access control. A read-only file should behave differently from a file available for both reading and writing. It is preferred to represent each file type through separate unilateral contracts. A read-only file unilateral contract may include the following behavioral expression: REC F (read.F+drop).0, whereas a read-write file's unilateral contract has the following behavioral expression: REC F (read.F+write.F+drop).0. In parsing the behavioral expressions, the term REC F indicates a recursion on a behavior phrase F; the behavior phrase F indicates the behavior expressions inside the pairs of parentheses; the verb "read" indicates a read operation; the period symbol "." denotes a sequence in which the behavior phrase before the period symbol occurs and after which the behavior phrase following the period symbol will then occur; the plus sign symbol "+" indicates a choice between one or more behavior phrases; the verb "write" indicates a write operation; the verb "drop" indicates the termination of the communication between two services; and the zero symbol "0" denotes the termination of the behavior expression.

Figure 3C:
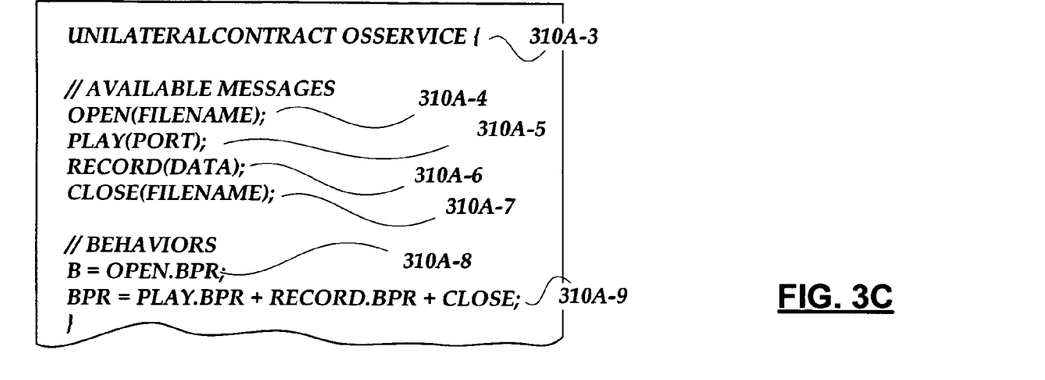
FIGS. 3C and 3D are unilateral contracts associated with services in accordance with the present invention.

A portion of the unilateral contract 310A-2 is illustrated in FIG. 3C. Line 310A-3 contains the key word UNILATERALCONTRACT followed by the designator "OSSERVICE," and a pair of open and closed curly brackets "{ }" for delimiting the definition of the unilateral contract 310A-2. Line 310A-4 declares the signature of the OPEN operation that takes a file name "FILENAME" as a parameter. To use the operating system service 310A, external services specify a name of a file to be opened via the OPEN operation. Thus, the OPEN operation should be the first operation that is invoked by other services for each session. The PLAY operation is declared on line 310A-5. The PLAY operation takes another service's port as a parameter. When the PLAY operation is invoked by other services, the operating system service 310A reads a stream of data from an open file and transmits the read data toward the given service's port. Other services, such as the operating system service 310B, can also record information to opened files via the RECORD operation, which is declared on line 310A-6. The RECORD operation takes data as a parameter. This data is written by the RECORD operation to the opened file. When all desired operations have been carried out on the opened file, the opened file can be closed via the CLOSE operation, which is declared on line 310A-7. The CLOSE operation takes a file name "FILENAME" as an argument so that the CLOSE operation knows which file to close.

Lines 310A-8-310A-9 contain the behaviors of the operating system service 310A. Line 310A-8 contains a behavior sentence: B=OPEN.BPR, where B is a behavior rule; OPEN denotes that the OPEN operation is the first operation to be invoked in using the operating system service 310A; the period "." denotes that additional behaviors are to follow the invocation of the OPEN operation; BPR refers to a second behavior sentence defined further on line 310A-9. Line 310A-9 contains the following behavioral sentence: BPR=PLAY.BPR+RECORD.BPR+CLOSE, where BPR denotes the second behavior; PLAY.BPR denotes the invocation of the PLAY operation, which is then followed by the second behavior again (a recursion); RECORD.BPR denotes the invocation of the RECORD operation, which is then followed, recursively, by the second behavior; CLOSE denotes the invocation of the CLOSE operation; and the plus signs "+" denote choices that other services, such as the operating system service 310B, can make to invoke among the PLAY operation, the RECORD operation, or the CLOSE operation.

Figure 3D:
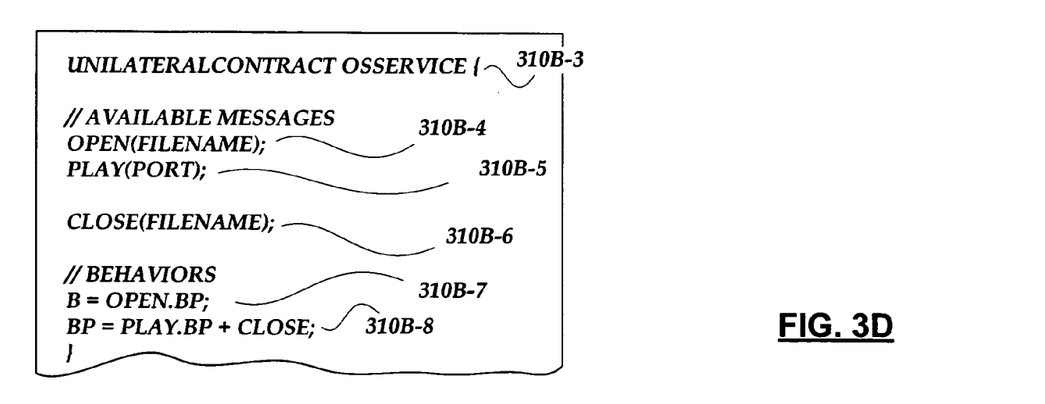

A portion of the unilateral contract 310B-2 is illustrated in FIG. 3D. Line 310B-3 contains the keyword UNILATERALCONTRACT followed by the designator "OSSERVICE," and a pair of open and closed curly brackets "{ }" for delimiting the definition of the portion of the unilateral contract 310B-2. Line 310B-4 declares the signature of the OPEN operation that takes a file name "FILENAME" as a parameter. The PLAY operation is declared on line 310B-5. The PLAY operation takes another service's port as a parameter. The CLOSE operation is declared on line 310B-6 and it takes a filename "FILENAME" as an argument so that the CLOSE operation knows which file to close.

Lines 310B-7-310B-8 contain the behaviors of the operating system service 310B. Line 310B-7 contains a behavior sentence: B=OPEN.BP, where B is a behavior rule; OPEN denotes that the OPEN operation is the first operation to be invoked in a session with the operating system service 310B; the period "." denotes that the additional behaviors are to follow the invocation of the OPEN operation; and BP refers to a second behavior sentence defined further on line 310B-8. Line 310B-8 contains the following behavioral sentence: BP=PLAY.BP+CLOSE, where BP denotes the second behavior; PLAY.BP denotes the invocation of the PLAY operation, which is then followed by the second behavior again (a recursion); CLOSE denotes the invocation of the CLOSE operation; and the plus sign "+" denotes choices that an external service, such as the operating system service 310A, can make to invoke among the PLAY operation and the CLOSE operation.

The unilateral contract 310A-2, when accepted by the operating system service 310B, and the unilateral contract 310B-2, when accepted by the operating system service 310A, creates an instance of communication between the operating system service 310A and the operating system service 310B. Each unilateral contract 310A-2, 310B-2 cannot be accepted by the operating system services 310A, 310B by a mere promise to perform, but preferably by the performance of unilateral contracts 310A-2, 310B-2 in accordance with the behaviors expressed in those unilateral contracts. Thus, if the operating system service 310B complies with and performs the behaviors as expressed by behavior sentences 310A-8, 310A-9 of the unilateral contract 310A-2, the operating system service 310B is bound to provide the promised services. For example, if the operating system service 310B has performed by first invoking the OPEN operation as specified by the behavioral sentence 310A-8 and then either invoking the PLAY operation or the RECORD operation or the CLOSE operation as specified by the behavioral sentence shown on line 310A-9, then the operating system service 310A complies with the requested invocations to provide the desired services, such as opening a file, playing the content of the file, recording content into a file, or closing the file.

Web Service Application Protocol And SOAP Processing Model

An exemplary protocol for using web services is the web services application protocol (WSAP), that, among other things, formally represents the state and behavior of a service via a port (e.g., URI), whereby the entities in a service may be contacted directly for interaction. In other words, unlike other protocols, WSAP describes the behaviors of a web service in a formalized manner, e.g., with each behavior of a service having its own port. The WSAP protocol also facilitates the usage of intermediaries by defining shared semantics on verbs, which identify what a message is, what the processing of message is, and how it affects the state/behavior of the receiver. Further, the ordering of messages and operations provides context to what is occurring.

In general, anytime the behaviors (or states) of a service's logical entities diverge, WSAP allows the service to give each behavior/state its own port (e.g., an identity such as URI). In this way, the client can communicate directly with the logical entity within the service that controls the behavior/state. By way of example, consider a web service that provides access to a storage device such as a hard disk drive. Traditionally, after opening a file via a file system and receiving a file handle, to read and write data to the open file, the client would send the file handle to the file system. With WSAP, instead of returning a file handle, an arbiter service returns a URI to another logical entity (another service) of the web service that provides access to the behavior (the operation to perform) on the appropriate state (the data). In this example, with WSAP the client would receive a port for writing (e.g., using a suitable XML schema) to allowed locations on the storage medium itself, and another port for reading from the storage medium, without again going through the arbiter. Note that a read operation corresponds to one behavior of a storage medium, and thus may have a different URI from a write operation, which corresponds to another behavior. As can be appreciated, this model of data access is more efficient than going to a file system controller for each operation, particularly if the file system would otherwise be a bottleneck.

Moreover, in addition to the WSAP's clear interaction points in the form of ports that expose state and behavior, WSAP messages use shared semantics that describe what can be done on the interaction point. The semantics comprise shared message verbs that are separate from the (possibly proprietary) message details, allowing any arbitrary intermediary to observe, to a known extent, what is taking place, while leaving the message contents secure.

Message ordering can also serve to provide context to an observer. For example, each service may define which WSAP operations it accepts, and in which order. Further, the communication with each port ordinarily identifies the behavior that is being requested, since each behavior may be assigned its own port. These interaction patterns between service ports, which in fact may be maintained as a list of ports, provide a readily observable directory of what WSAP operations occurred, and in what order they occurred.

As a result, an intermediary can process exchanged messages to add value to communications. For example, when it is known from the requested operation type and/or known URI that a message will not change the state of a resource, an intermediary such as a cache service can safely read data from its own cache to satisfy the request, rather than invalidate the cache and pass the message (to another service) to access other storage media. Note that the intermediate cache service need only know the operation type from the protocol's semantics, or the URI if known to be to a read-only service, and not the internal contents of the message, which may remain secure (and indeed may have been encrypted via another intermediary service). Examples of such read-like operations in WSAP in which no state changes are involved include operations referred to using the shared semantics of QUERY or GET. Such operations each have the characteristic of being safe, essentially meaning read-only access is sufficient to satisfy the operation request, and idempotent, essentially meaning that the same operation can be repeated indefinitely without changing state. Note that a cache is only one example of such an intermediary, and an intermediary can be any other service as appropriate, e.g., a load balancer, data compressor, replication service, encryption/decryption mechanism, and so forth.

Moreover, because of behaviors having their own ports, a SOAP processing model is provided that defines how to compose multiple web services to run in parallel or sequentially. The model allows the implementation of several services, such as the SOAP-aware serializer, to serialize or deserialize the header and body of a given SOAP message concurrently. This allows services that depend upon parts of the SOAP envelope to unblock whenever a header that a service cares about is available. Note that when two communicating parties are co-located, e.g., on the same device, the forwarding and transport services do not serialize the SOAP envelope for performance reasons.

In a distributed programming model, a basic programming primitive is a lightweight port, comprising an unordered collection of messages that can be used to store state and effect communication. Items are stored by reference, and ports support (at least) two primitive operations: Post( ) and Get( ). Posting an item, such as a class instance, buffers the reference and returns immediately. Retrieving an item based on a supplied key can block if no item with the key has been posted by the remote service. Although ports can be used directly by services, they are typically used within the context of a port collection that associates a specific message type with each port in the collection. Port collections can be created with a fixed or a dynamic set of supported message types depending on the flexibility needed, but from a programmer's point of view, a port collection is simply a typed port.

Using strictly port communication, service code can implement critical sections and complicated I/O protocols and produce a very concurrent processing model. To this end, as described further below, WSAP communicates with a web service, in which a client consumer requests a server provider to perform some service for the client, and provide the client with an appropriate response. As will be understood, however, the general web service model is not limited to a server running software for a client, but applies to any resource that a client wants to access, e.g., the uniform service model supported by WSAP can be used to model files, devices, services, and people. For example, hardware may be componentized to an extent, and in many ways will be virtually indistinguishable from software-oriented web services, in that a user may select a set of hardware components and interconnect them to perform a computing task. As long as each device obeys the communication protocols (and the appropriate amount of bandwidth is available), virtually any authorized device will be able to communicate with another device to use its resources.

Figure 4:
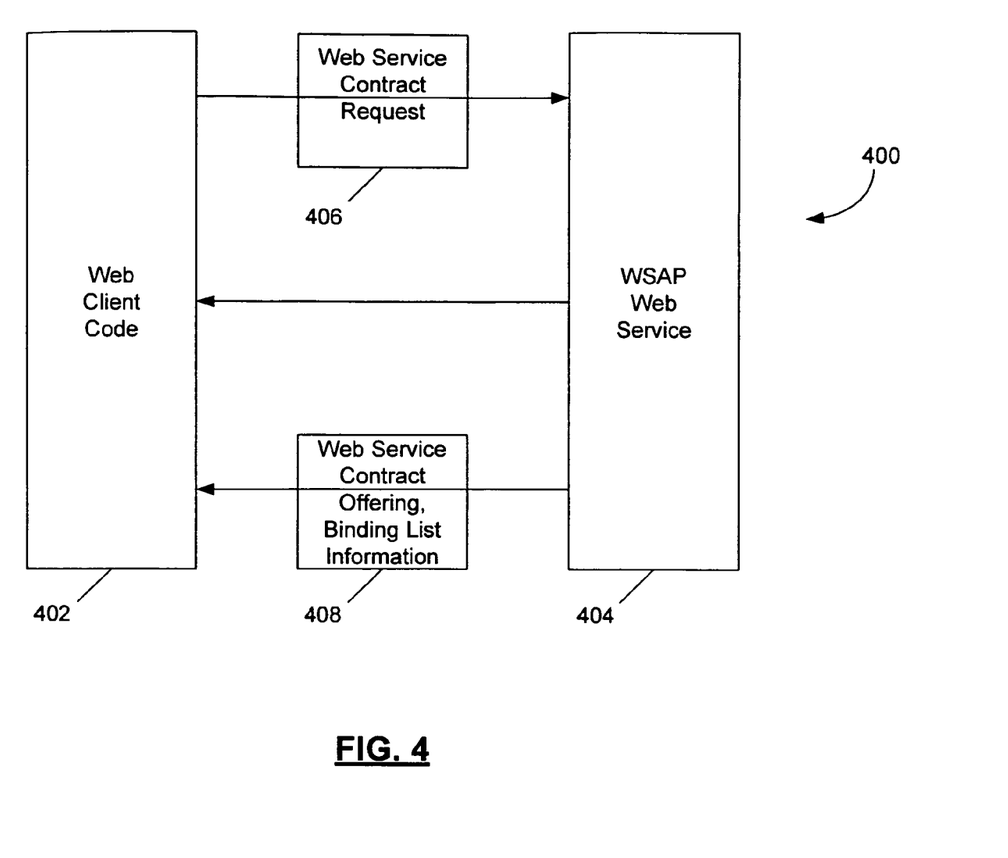
FIG. 4 is a block diagram generally representing services communicating with one another over a web services application protocol in accordance with the present invention.

FIG. 4 represents an architecture 400 comprising web client code 402 (e.g., which may be a computer system, such as that described with respect to FIG. 1) communicating with a web service 404 via WSAP messages communicated within a SOAP (simple object access protocol) envelope. The identity of a service is described by a named port (e.g., a URI), and the state of a service is typically described by an XML schema. Note that the service may be local (within the same machine as the client code) or may be a remote resource such as a server or a hardware device. In general, WSAP defines, semantically, what a web service does, while the SOAP processing model defines how to compose multiple web services to run in parallel or sequentially, and may be used in accordance with the present invention to compose internal services to a computing device in a manner that is substantially identical to external web services, e.g., via in-memory non-XML serialized data.

As with other web services, WSAP-capable services operate by offering a contract in response to a contract request, as represented in FIG. 4 by the web service contract request 406 and contract offering 408. Note that in WSAP, to obtain a contract, a port is exposed to the client corresponding to a LOOKUP operation. Binding list information is provided with the response 408, e.g., as an identifier/port that corresponds to an array of key/value pairs that "instance" the contract. Services are not required to implement WSAP operations other than the LOOKUP operation, although when the semantics of an interaction is compatible with a WSAP operation, the WSAP service should implement the WSAP operation. In providing a service, the service author may map any interaction or service functionality using WSAP verbs and representations. Not all WSAP verbs have to be used for a particular service, but instead a subset may be used, depending on the scenario.

WSAP is a SOAP-based protocol useful in a distributed computing environment that defines a web service in terms of identity, state, and a set of operations that can be used according to the behavior of the service. This effectively enables services and their state to be operated upon in a consistent and observable manner. In WSAP, a behavioral web service is an abstract notion of a process that has an identity and a behavior. This concept is abstract in the sense that it can apply to many different application models and namespaces. WSAP defines one such application model which has been designed to scale to the internet at large, but many other application models are possible.

The notion of identity in WSAP is similar to that of a resource identified by a URI in the traditional web model, namely anything that has identity. The purpose of identity is to enable a service to differentiate itself from other services that may exist within the same namespace. The scope of WSAP web services may be the internet, which means that DNS or IP is the naming authority for the URI "authority" component, although in more a limited scope such as within a device or limited network, another naming authority is feasible.

Each WSAP web service has a unique identity or URI. As with any other URI (such as on the web), no semantic knowledge is obtained based on the URI alone, and similarly, a relationship (e.g., a containment relationship) between two WSAP web services cannot be deduced from their URIs. In WSAP, URIs may be either relative or absolute. If a URI is relative then its base is determined by XML Base. WSAP does not place any limit on the length of a URI, and thus any WSAP receiver needs to be able to handle the length of any URI that it publishes; WSAP implementations should be able to deal with URIs of at least two kilobytes in length.

The interaction between services (which can be thought of as a protocol) is the behavior of a service, and can be formally described as a behavioral type, with the contract being the description of a service using behavioral types. A service can be implemented in any number of ways, as long as it conforms to the contract it claims to implement. Note that in WSAP, a contract is a service like essentially everything else, whereby contracts are identified by ports (e.g., URIs) and can be operated on as any other service, according to its contract.

The notion of behavior is based on how a service interacts with its environment in terms of the sequence of message types that it generates and accepts. Behavior enables a service to differentiate its particular behavior from the behavior of other services that may exist within the same namespace, and behavior is relative to the set of possible behaviors defined for a particular namespace in which the service is defined. In other words, behavior is a distributed state machine exposed by the service. Thus, by including the interactions of those resources or services with other services, behavior augments the current web model for identifying resources. Two services need to have compatible behaviors to communicate; that is, they must compose. If the behavior of a service is not known by another service, this implies that the two services cannot interact, which is similar to the web model of a resource wherein a URI cannot be dereferenced because the mechanism for doing so is unknown to the holder of that URI.

Exemplary Embodiments

The exemplary embodiments described herein can be used in a distributed operating system, such as the one described above, and use a protocol, such as WSAP, described above, though the invention can be implemented in any appropriate system using any appropriate protocol, and is not limited to a distributed operating system and/or WSAP.

A web service in accordance with the present invention may comprise components such as a location, a behavior, and semantics. For example, a service may include a designation primitive, a behavioral primitive that comprises a unilateral contract, and a communication primitive. An exemplary system may include a distributed operating system for orchestrating the services executing on a computer system so as to control and coordinate resources.

Figure 5:
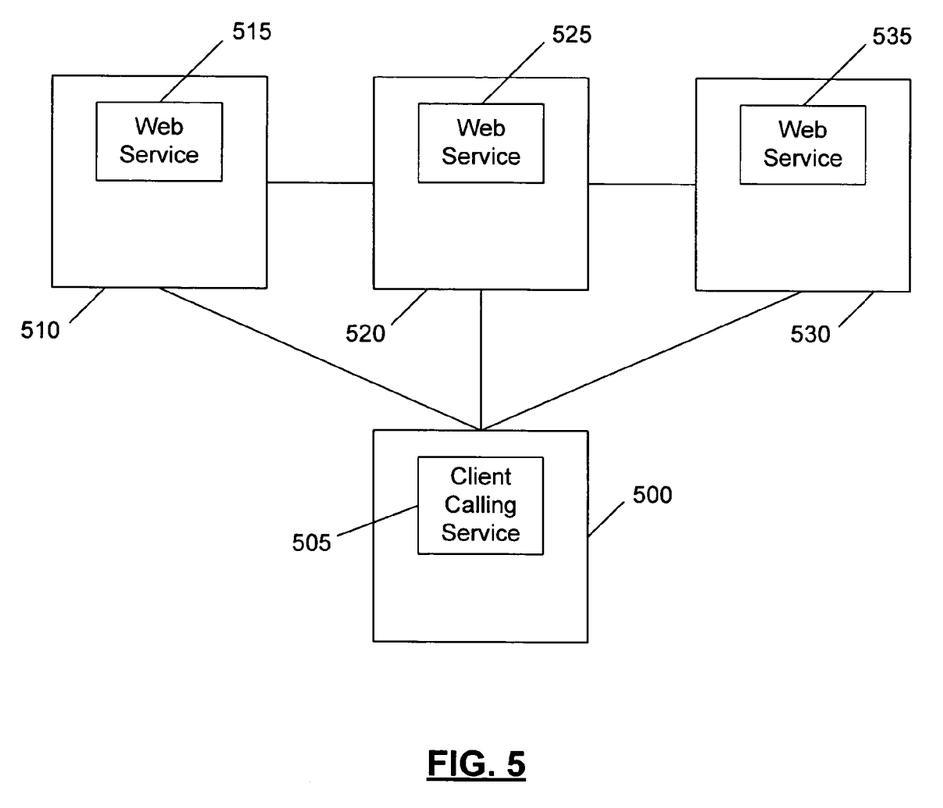
FIG. 5 is a block diagram of an exemplary web service system in accordance with the present invention.

Exemplary web services include a data service and a stateless control service. For example, a data service and a stateless control service may run on a single node, such as a computing device. A block diagram of an exemplary system with nodes and web services is shown in FIG. 5. As shown, a client 500 sends a work item or request to the computing devices (nodes) 510, 520, 530 via a calling service. The client 500 may send the work item or request directly to each of the computing devices 510, 520, 530, or via an intermediary (not shown).

Each computing device preferably comprises a stateless control service and a data service, though other services and arrangements are contemplated, and the general term "web service" is shown in FIG. 5. There is a relationship between the stateless control service and the data service on each computing device. A client calling service may call the stateless control service, on a computing device, which then may access the data service to provide requested information, for example, to the client calling service. A second computing device, remote from the first computing device, may also comprise a data service and a stateless control service. Another computing device may desire to have an identical copy of the data service to that of the first computing device, in which case the second data service may subscribe to the first data service's updates. In an exemplary case of multiple computing devices, each comprising a web service, it is contemplated that each will have subscriptions to the others, so that they are in sync by, e.g., publish/subscribe mechanisms. Thus, the web services 515, 525, 535 residing on the various computing devices 510, 520, 530 are desirably multiple, identical copies.

Each web service, residing on an associated computing device, may have an associated reputation. Although the web services should be identical, and hence have identical reputations, there may be instances in which this is not the case. For example, a web service may be affected by a virus, in which case, it gives incorrect results, or results that are not in sync with what the other web services would generate. Thus, a client may desire to access the web service having the highest or best reputation to be ensured of a greater degree of accuracy and confidence. Thus, the client 500 may check the reputation of each potential web service, and then select which one to attach to, or select which one's result to use (e.g., the client 500 will use the result of the web service having the highest reputation).

Figure 6:
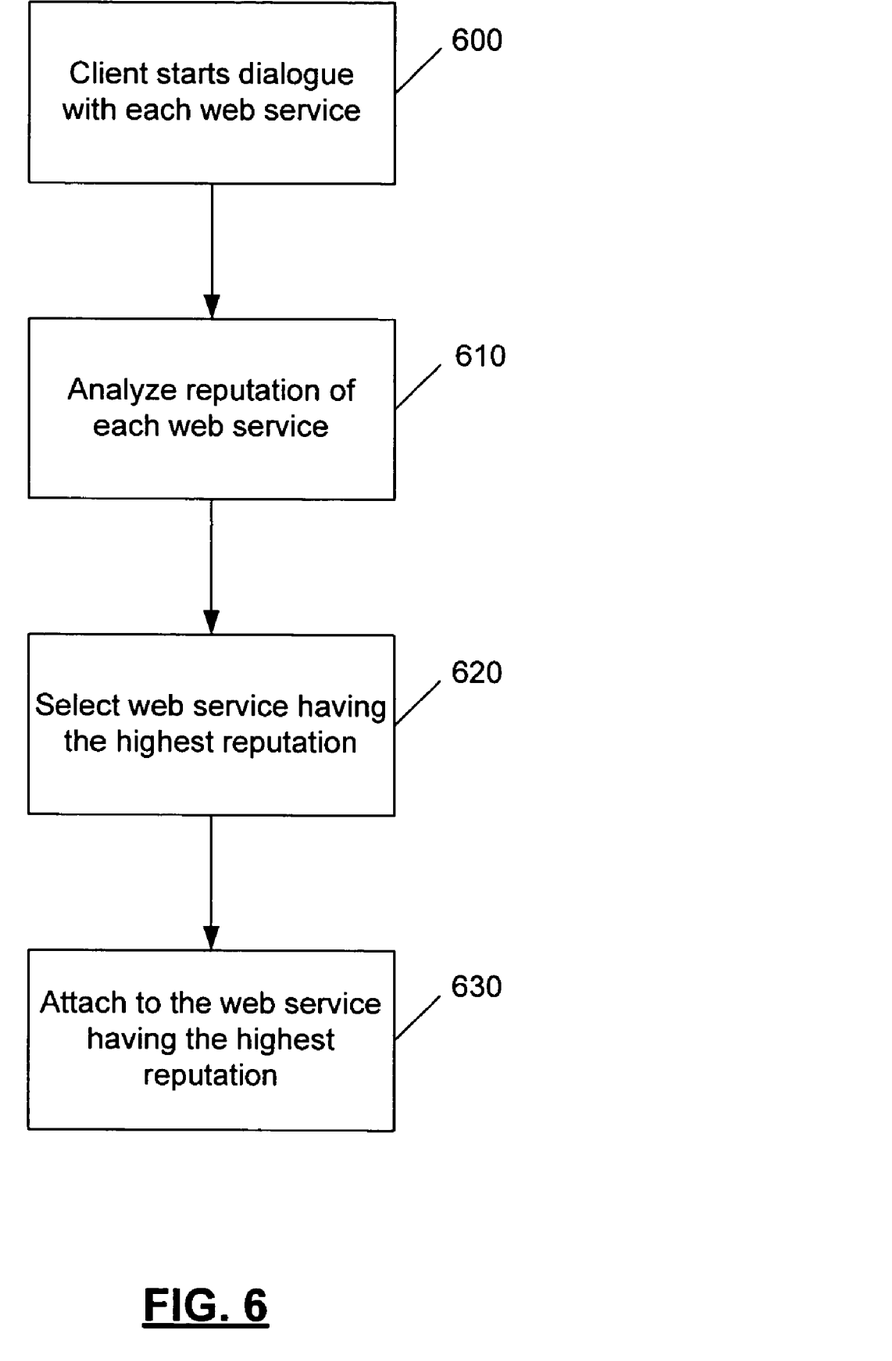
FIG. 6 is a flow diagram of an exemplary method of determining which web service to attach to in accordance with the present invention.

FIG. 6 is a flow diagram of an exemplary method of determining which web service to attach to in accordance with the present invention. The client starts a dialogue with each of the multiple, identical web services, at step 600, that has a capability of fulfilling the client's work item or request. At step 610, the client analyzes the reputation of each web service to determine and select which has the highest reputation (step 620). This is desirable, for example, when the computing devices are not communicating with each other, in which case their services may not be in sync with each other. The client then attaches to that web service having the highest reputation, at step 630, or otherwise ultimately uses the result provided by that web service. It is noted that after the caller sends the request to analyze the reputation of each web service, the caller is desirably able to perform other work while the request is being satisfied.

As described herein, multiple, identical copies of desired web services (e.g., web services 515, 525, 535) may be run across computing devices (e.g., devices 510, 520, 530 in a distributed operating system) to provide reliability in the face of failure in any one node (which may be considered to be resident on, or coincident with, an associated computing device). By running multiple copies of these services, the services may vote amongst themselves on the results in the event that one or more of the services starts giving incorrect or otherwise inconsistent results. Such results can be from sickness in the underlying hardware, or via a malicious virus infecting one of the nodes, for example. Desirably, an odd-numbered copy of services is used in scenarios involving voting, in order to prevent voting deadlocks or ties. However, other methods of determining the preferred result may be used, such as considering additional factors like the reputation of the particular web service, how long the particular web service has been active, and how many inward links exist to the particular web service.

Figure 7:
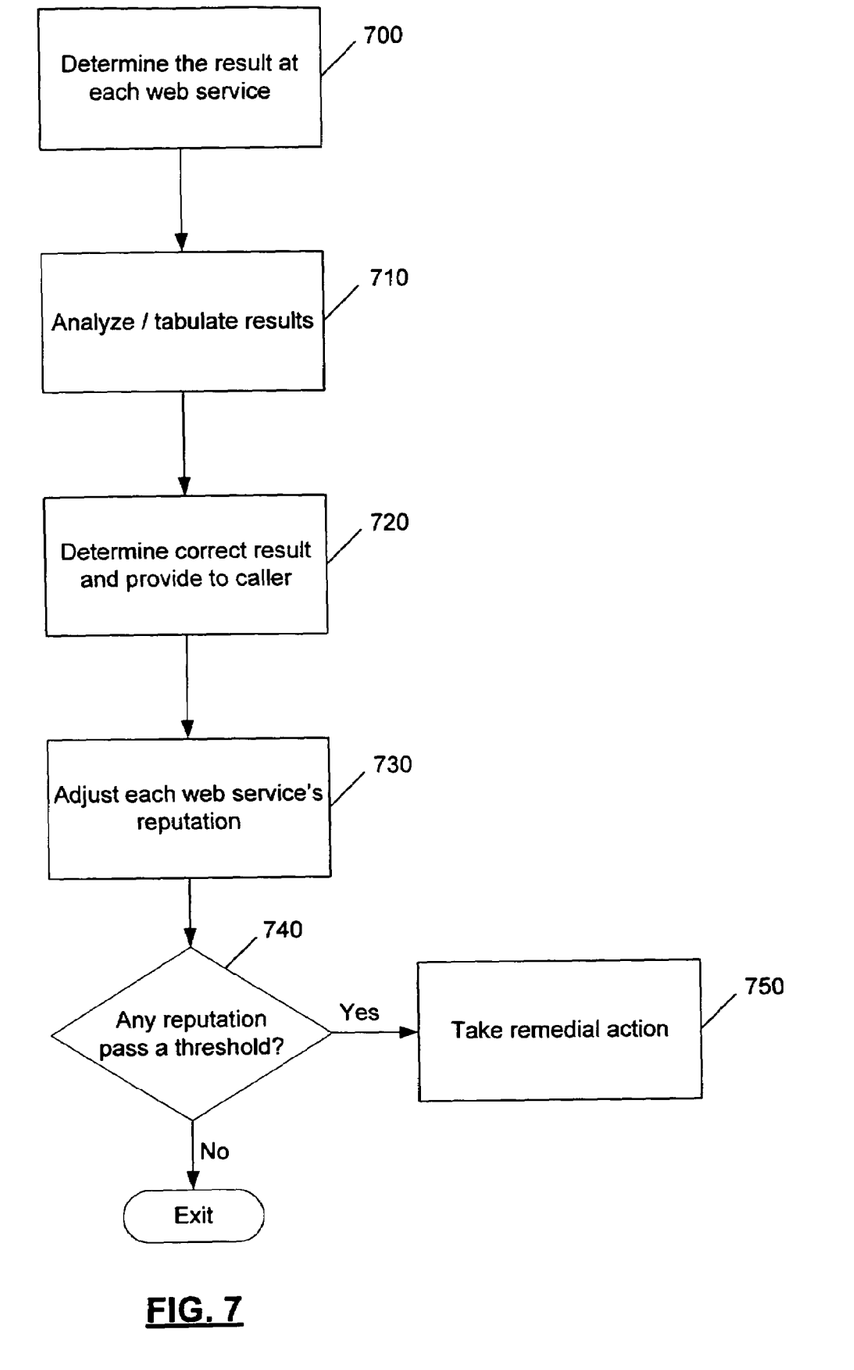
FIG. 7 is a flow diagram of an exemplary method of voting and reputation adjustment among web services in accordance with the present invention.

FIG. 7 is a flow diagram of an exemplary method of voting and reputation adjustment among web services in accordance with the present invention. At step 700, each web service determines its result (e.g., the result to a client's work item or request). At step 710, the results are tabulated or otherwise analyzed to determine which result is prevalent. Because the copies of the web services are supposedly identical, each result should be identical. However, for various reasons, such as a virus or malfunctioning software or hardware, the results may not be identical across all the copies of the web service being run on the various computing devices.

The result that is most prevalent is determined to be the accurate or "correct" result, at step 720, and this result is reported back to the calling party or client device. For example, if web service 515 and 525 each determined the result to a client's request to be "1" and if web service 535 determined the result to the same request to be "2", the result of "1" would be most prevalent (two result occurrences of "1" versus one result occurrence of "2"), and this result would be reported back to the client.

By combining this voting with reputation data associated with each copy of the web service, a service's reputation can be dynamically adjusted, at step 730, based upon how faithfully it computes the results of work items (e.g., messages) sent to it. For example, a service which has been taken over by a virus may still have the desired cryptographic keys to communicate to its brethren nodes; however, any variance from its contract will desirably result in a decrement to its reputation. Continuing with the example in which web service 515 and 525 each determined the result to a client's request to be "1" and web service 535 determined the result to the same request to be "2", because web service 535 got the less popular, and hence incorrect, answer, the reputation of web service 535 is decreased. Moreover, the reputations of web services 515 and 525 may be increased because they got the correct result. It is contemplated that other factors may affect a web service's reputation, such as responsiveness, latency, and uptime.

Once a web service on a particular node passes a certain reputation threshold (meaning that the web service's reputation has decreased beyond a predetermined acceptable level), the system can fail over to healthy node, shun the poorly behaving service, cut off its life support (e.g., scheduling, memory management), kill it, and/or restart the service on a known good node. Thus, a trustworthy system can be created from multiple untrusted sources. With respect to FIG. 7, after the web services have had their reputations adjusted accordingly, it is determined at step 740 if any of the web services have reputations that now exceed a threshold. If so, then remedial action is taken, at step 750 (e.g., fail over, restart the web service on another computing device, etc.).

Thus, each of the web services, when in communication with each other, may check and compare their respective results with each others' results. Based on these results, the services vote to determine which result is "correct". Each service's reputation is then adjusted based on how its result compared to the "correct" result. It is noted that a positive feedback loop is desirably created. A larger community of service reputations leads to greater overall trust, which attracts a larger community of services, which increases the overall trust in the composite system.

Figure 8:
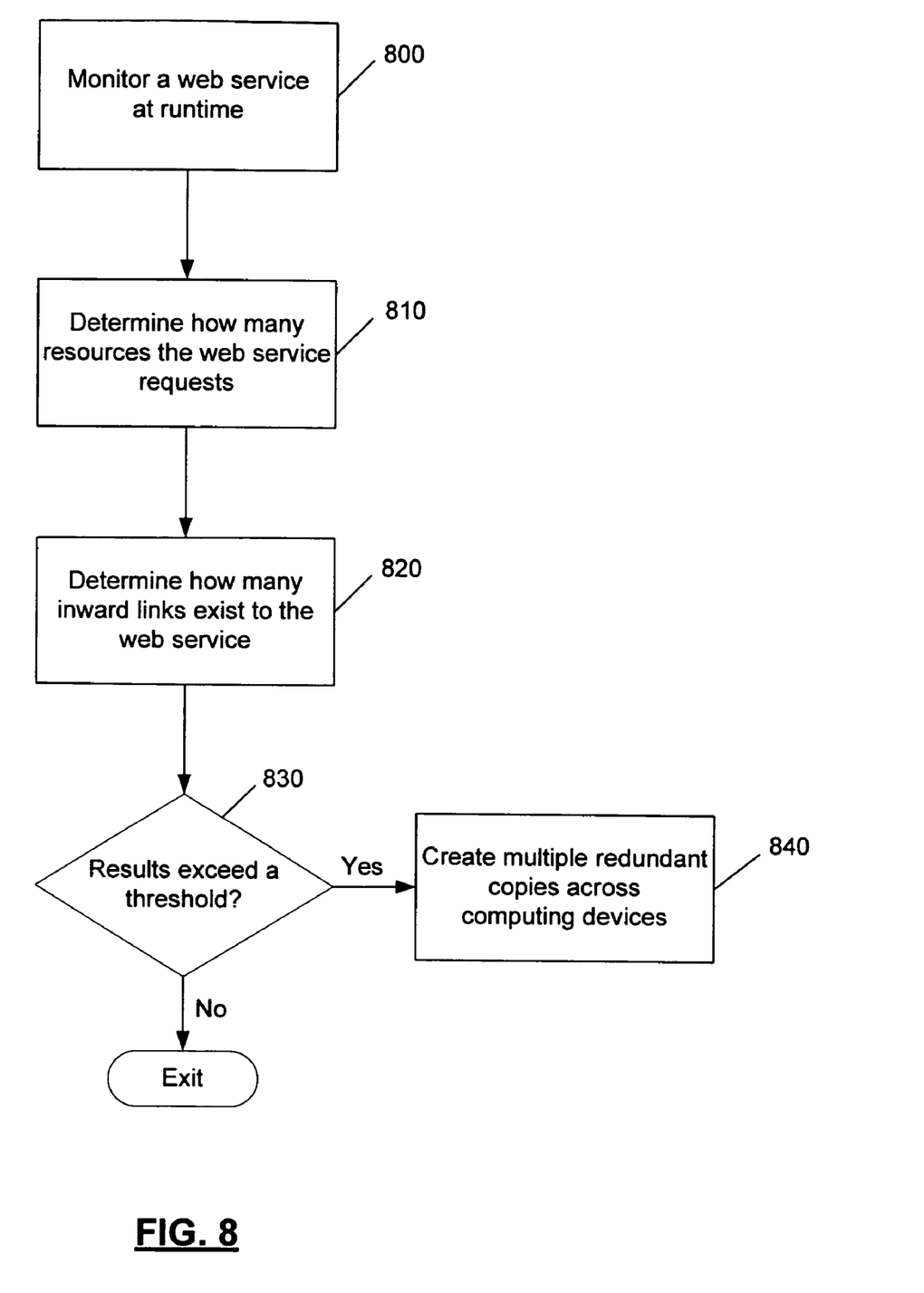
FIG. 8 is a flow diagram of an exemplary method of determining whether a service should be executed in multiple copies in accordance with the present invention.

In a typical computing system, resources are scarce and must be allocated appropriately. Not every web service would be considered "worthy" or "important" enough to warrant providing and executing multiple redundant copies across computing devices, in such a scarce resource environment. FIG. 8 is a flow diagram of an exemplary method of determining whether a service should be executed in multiple copies in accordance with the present invention. The services that are desirably implemented as multiple, identical copies may be dynamically determined at runtime based upon an observation of the resources the service requests, plus a notion of relative service priority. Services which tend to consume a lot of resources (e.g., relative port i/o activity, memory usage, network traffic, etc.) are desirably candidates for "importance". Thus, if a service is not doing much, it may not be as important and worthy of replication as one which is consuming more CPU time. Services which are truly "important" will tend to bubble-up in prioritization at runtime, and those become candidates for automatic replication. While static system policy can be used to dictate how many services should be replicated, this scheme allows for automatic discovery of the correct services to replicate. This will also result in a biological-inspired set of fluid emergent behaviors which are not easily predicted when the individual services are initially authored.

At step 800, a web service is monitored at runtime. It is determined how many resources the service requests at step 810, and how many inward links exist to the web service, at step 820. The results of steps 810 and 820 are considered and compared to a threshold value, at step 830. Based on the comparison to the threshold value, it is determined whether or not to create multiple redundant copies of the web service. If so, then the multiple redundant copies are created on various computing devices, at step 840.

Services can be intermediaries for other services. A first tier of services may be controlled by a second tier of services, for example. Thus, multiple tiers of services may be implemented into an exemplary computing system. The services on a given node compete for resources (memory and bandwidth) which are allocated by a local scheduler. For example, multiple first-tier nodes vote for an elected second-tier leader node which is responsible for allocating competing resources across the multiple first-tier nodes. Depending upon the depth of the service composition, the second-tier leaders may elect third tier leaders as desired.

CONCLUSION

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the functionality of the present invention.

While the present invention has been described in connection with the preferred embodiments of the various figures, it is to be understood that other similar embodiments may be used or modifications and additions may be made to the described embodiments for performing the same functions of the present invention without deviating therefrom. Therefore, the present invention should not be limited to any single embodiment, but rather construed in breadth and scope in accordance with the appended claims.

What is claimed is:

1. A method of managing web services, comprising:
    assigning a reputation to each of a plurality of web services, each web service being associated with one of a plurality of computing devices;
    receiving a request from a client;
    determining a result for the request at each web service;
    determining a preferred result;
    adjusting the reputation of each web service having a result that is inconsistent with the preferred result;
    subsequent to the adjusting, for each web service, determining if the reputation of the web service exceeds a threshold; and
    for each web service having a reputation that exceeds the threshold, deactivating the web service and redirecting further requests directed to the web service that has been deactivated to another web service having a reputation below the threshold.

2. The method of claim 1, wherein determining the preferred result comprises analyzing each result from each web service.

3. The method of claim 2, wherein analyzing each result comprises determining the number of matches between the results, and setting the preferred result to the result having the highest number of matches.

4. The method of claim 1, wherein adjusting the reputation comprises lowering the reputation of each web service having a result that is inconsistent with the preferred result.

5. The method of claim 1, further comprising adjusting the reputation of each web service having a result that is consistent with the preferred result.

6. The method of claim 5, wherein adjusting the reputation comprises increasing the reputation of each web service having a result that is consistent with the preferred result.

\* \* \* \* \*